United States Patent
Dobai et al.

(10) Patent No.: US 12,500,038 B2
(45) Date of Patent: Dec. 16, 2025

(54) ANODE LEAD TAB AND ELECTROLYTIC CAPACITOR

(71) Applicant: TDK Electronics AG, Munich (DE)

(72) Inventors: László Dobai, Szeleste (HU); Zita Dominkovics, Sarvar (HU)

(73) Assignee: TDK Electronics AG, Munich (DE)

(*) Notice: Subject to any disclaimer, the term of this patent is extended or adjusted under 35 U.S.C. 154(b) by 73 days.

(21) Appl. No.: 18/553,921

(22) PCT Filed: Apr. 5, 2022

(86) PCT No.: PCT/EP2022/058947
§ 371 (c)(1),
(2) Date: Oct. 4, 2023

(87) PCT Pub. No.: WO2022/218748
PCT Pub. Date: Oct. 20, 2022

(65) Prior Publication Data
US 2024/0194417 A1    Jun. 13, 2024

(30) Foreign Application Priority Data
Apr. 15, 2021 (DE) .......................... 102021109472.0

(51) Int. Cl.
*H01G 9/008* (2006.01)
*H01G 9/15* (2006.01)

(52) U.S. Cl.
CPC ............. *H01G 9/008* (2013.01); *H01G 9/151* (2013.01)

(58) Field of Classification Search
None
See application file for complete search history.

(56) References Cited

U.S. PATENT DOCUMENTS

| | | | |
|---|---|---|---|
| 6,307,733 | B1 | 10/2001 | Maruyama et al. |
| 11,158,464 | B2 | 10/2021 | Will et al. |
| 2014/0161970 | A2* | 6/2014 | Hong ............ H01G 9/07 427/80 |

FOREIGN PATENT DOCUMENTS

| | | | |
|---|---|---|---|
| DE | 10003261 A1 | 8/2000 | |
| DE | 102016125733 A1 | 6/2018 | |
| FR | 2689301 A1 * | 10/1993 | ........ C23C 14/0021 |
| JP | S56112931 U | 8/1981 | |
| JP | H0394414 A | 4/1991 | |
| JP | 2001052966 A | 2/2001 | |
| JP | 2001203127 A | 7/2001 | |
| JP | 3416099 B2 | 6/2003 | |
| JP | 2005103615 A | 4/2005 | |
| JP | 2008066518 A | 3/2008 | |

* cited by examiner

*Primary Examiner* — Eric W Thomas
(74) *Attorney, Agent, or Firm* — Slater Matsil, LLP

(57) ABSTRACT

In an embodiment an anode lead tab is configured for externally contacting an anode foil in an electrolytic capacitor, wherein the anode lead tab has a roughened surface configured to protect the anode lead tab from surface dissolution.

10 Claims, 2 Drawing Sheets

ANODE LEAD TAB AND ELECTROLYTIC CAPACITOR

CROSS-REFERENCE TO RELATED APPLICATIONS

This patent application is a national phase filing under section 371 of PCT/EP2022/058947, filed Apr. 5, 2022, which claims the priority of German patent application 102021109472.0, filed Apr. 15, 2021, each of which is incorporated herein by reference in its entirety.

TECHNICAL FIELD

The present invention relates to an anode lead tab, an electrolytic capacitor comprising an anode lead tab and a method of manufacturing an anode lead tab.

BACKGROUND

The life time of aluminium electrolytic capacitors is shortened due to the limited purity of their raw materials.

One common failure mode is the electrochemical corrosion of the capacitor's anode lead tab which causes the disintegration of the lead tab.

The electrochemical corrosion of anodic lead tabs is caused by halogen ions which start electrochemical reactions with the material of aluminium anode lead tabs. The most frequent halogen is Cl, which is a natural impurity of almost every raw material.

Patent application document DE 10 2016 125 733 A1 discloses an oxide layer protecting an aluminum anode from environmental impacts.

However, voids and cracks in the oxide layer are unavoidable.

SUMMARY

Embodiments provide an improved anode lead tab and an improved electrolytic capacitor.

The present invention provides an anode lead tab configured for externally contacting an anode foil in an electrolytic capacitor, providing a roughened surface that protects the anode lead tab from surface dissolution.

An electrolytic capacitor according to this invention is a capacitor having a liquid electrolyte, an anode foil, a cathode foil, separators between anode and cathode foil and furthermore tabs which electrically connect the anode foil and the cathode foil to external contacts.

In particular, an aluminium electrolytic capacitor is a polarized capacitor whose anode is made of aluminium on which an insulating oxide layer is formed by anodization. The oxide layer acts as the dielectric of the aluminium electrolytic capacitor. The liquid electrolyte covers the surface of the oxide layer and in principle serves as the second electrode of the capacitor which is in electrical contact with the cathode foil. A separator is positioned between the anode and the cathode foil. The separator may comprise a paper sheet impregnated with the liquid electrolyte.

The aluminum electrolytic capacitor may be configured as a hybrid polymer electrolytic capacitor which is an electrolytic capacitor having a liquid electrolyte and a solid electrolyte of conductive polymer particles. The polymer may cover the anode foil, the cathode foil, separators and the tabs which electrically connect the anode foil and the cathode foil.

The anode lead tab is an electrical conductible lead tab connecting the anode foil of an electrolytic capacitor with an external contact electrically and mechanically.

The anode lead tab may be configured as a flexible metal strip fixed to the anode foil on one side and to an external contact on the other side.

The metal strip may comprise an electrical conductible metal, preferably aluminum (Al). The metal strip may comprise a metal foil, preferably aluminum foil.

The external contact may be configured as a bottom or a cover of a can housing the electrolytic capacitor. In an embodiment the can houses the capacitor and a liquid electrolyte.

The external contacts may be configured as separate elements. Preferably the external contacts may be integrated in the can's cover or in the can's bottom.

The electrolytic capacitor may comprise a winding element.

The capacitor and in one embodiment the winding element comprises an anode foil, a cathode foil and a separator. The separator separates anode foil and cathode foil.

The anode lead tab may be fixed by clamping or welding to the anode foil and the external contact. The anode lead tab may be preferably fixed by welding.

The electrolytic capacitor is impregnated with a liquid electrolyte.

The electrical lead tab is in direct contact with a liquid electrolyte of the electrolytic capacitor.

In general, in such a capacitor unwanted side reactions between that liquid electrolyte and the electrical lead material are possible.

It is unavoidable that the surface of the electrical lead tab comprises at least minimal contents of impurities. Furthermore, also the liquid electrolyte comprises unavoidably impurities. The impurities trigger and accelerate unwanted side reactions. Typical unwanted impurities comprise halogens such as Chlorine (Cl), Iodine (I), Bromine (Br) and Fluorine (F). Especially a minimum content of Cl is unavoidable.

By roughening the surface of the lead tab the surface area of the lead tab is increased. The impurities are widely distributed on the increased surface. This means that spatial distances between single impurity particles are increased and thus the concentration of impurities per surface area is decreased.

Impurities such as halogen ions and organic (halogen) compounds cause unwanted side reactions between an anode lead tab material and a liquid electrolyte surrounding the lead tab.

In said side reactions the lead tab material is chemically converted into solvable (halogen) salts dissolving in the aqueous liquid electrolyte.

In a worst case scenario such side reactions cause a total dissolution of the anode lead tab. A wide distribution of such impurities prevents the creation of clusters of impurities which accelerate said side reactions.

In further embodiments, the anode lead tab is protected by an oxide layer. However an oxide layer bears the risk that cracks or voids are formed inside the layer. Such cracks or voids provide reaction hotspots, which are locations where side reactions take place preferably.

Side reactions can be suppressed by providing only low amounts of impurity components at the hotspot locations. By roughening the surface and increasing the surface the concentration of impurities on the surface and the concentration of impurities at such hotspots can be reduced.

The liquid electrolyte comprises unavoidably impurities like halogen ions and compounds, such as Cl.

If the impurities accumulate at a single location of the electrical lead tab, side reactions are accelerated.

Due to side reactions the concentration of impurity components decreases at the reaction sites where the side reactions take place. This causes a diffusion of further impurity compounds to the reaction sites.

Furthermore the side reactions also lead to a surplus of positive cations at the reaction sites which further causes diffusion of negative charged anions like halogen ions to the reaction sites.

Due to these effects the side reactions accelerate and dissolve the lead tab.

By roughening the surface the creation of concentration hotspots of impurities on the surface of the lead tab causing the described unwanted effects can be prevented.

In an embodiment, the specific surface area of the roughened surface is at least 10 times greater than the specific surface area of a smooth surface.

The described roughness prevents an unwanted accumulation of impurity components on the surface of the electrical lead tab. The creation of concentration clusters of impurity components is further decreased.

In an embodiment, the specific capacity of the roughened surface is 3 $\mu F/cm^2$ or more. In a preferred embodiment, the specific capacity of the roughened surface is 5 $\mu F/cm^2$ or more and more preferred 30 $\mu F/cm^2$ or more.

The specific capacity is the electric capacity of the roughened surface relative to the area of the surface projected in a plane.

The specific capacity can be determined experimentally.

For example, the specific capacity can be measured in a highly conductive electrolyte by using an LCR meter (inductance L, capacitance C and resistance R). Two tab specimens are measured against each other.

A high specific capacity decreases the risk of unwanted side reactions and electrical leakage or short-circuit phenomenon.

An additional benefit of a high surface anode lead tab is that the specific capacity value of the high surface anode lead tab is close to a usual specific capacity value of the anode foil capacitance value. Thus, the risk of an unbalanced current distribution on the surface of the anode foil versus the surface of the anode lead tab decreases, and as a consequence the risk of a catastrophic short circuit between anode lead tab and the capacitor's cathode is minimized.

In an embodiment, the anode lead tab comprises Aluminum as a main material.

Aluminum as a base metal has a good electrical conductibility and a comparable low price.

Furthermore aluminum has a good formability and good flexibility.

Thus, flexible tabs in a desired shape can be easily manufactured, which show high robustness against external mechanical impacts.

In an air atmosphere aluminum reacts with air oxygen to form automatically an aluminum oxide protection layer.

In an embodiment, the roughened surface is passivated by an oxide layer.

If the anode lead tab comprises aluminum, the oxide layer may be formed automatically by reaction of the aluminum with air oxygen.

Otherwise or alternatively, the oxide layer may be applied during manufacturing of the lead tab.

The oxide layer protects the lead tab additionally against outer impacts such as chemical surface reactions.

If unwanted cracks or voids appear inside the oxide layer, the roughening of the surface acts as a second means of protection.

In an embodiment, the oxide layer has at least a thickness of 3 nm.

In an oxide layer with said thickness the risk of contact between the liquid electrolyte and the surface of the anode lead tab can be minimized.

The present invention further provides an aluminum electrolytic capacitor comprising the anode lead tab according to any of the embodiments described before.

In an embodiment, the aluminum electrolytic capacitor comprises at least two or more anode lead tabs. At least one or all of the anode lead tabs are configured according to any of the embodiments described before.

The use of two or more anode lead tabs for connecting the anode foil to the external contact or several external contacts allows to use a long and broad anode foil. The use of multiple tabs further reduces the metal resistance of the winding element as a current can be fed into the winding element at multiple locations, thus reducing the length which the current has to travel inside the winding element.

The present invention further provides a method of manufacturing an anode lead tab providing a roughened surface.

The may be configured according to any of the embodiments described before.

The manufacturing method comprises at least the following steps.

In a first step an anode lead tab with a smooth surface is provided.

In a second step the smooth surface is roughened by chemical etching, electrochemical etching, mechanical treatment, plasma treatment, laser treatment or combinations of said processes until a specific capacity of 3 $\mu F/cm^2$ or more is achieved.

The specific capacity corresponds directly to the surface area and thus to the surface roughness of the surface of the anode lead tab.

BRIEF DESCRIPTION OF THE DRAWINGS

In the following, the embodiments of the invention will be explained in more detail with reference to accompanied figures. Similar or apparently identical elements in the figures are marked with the same reference signs. The figures and the proportions in the figures are not scalable. The invention is not limited to the following embodiments. The figures show.

DETAILED DESCRIPTION OF ILLUSTRATIVE EMBODIMENTS

Figure 2:
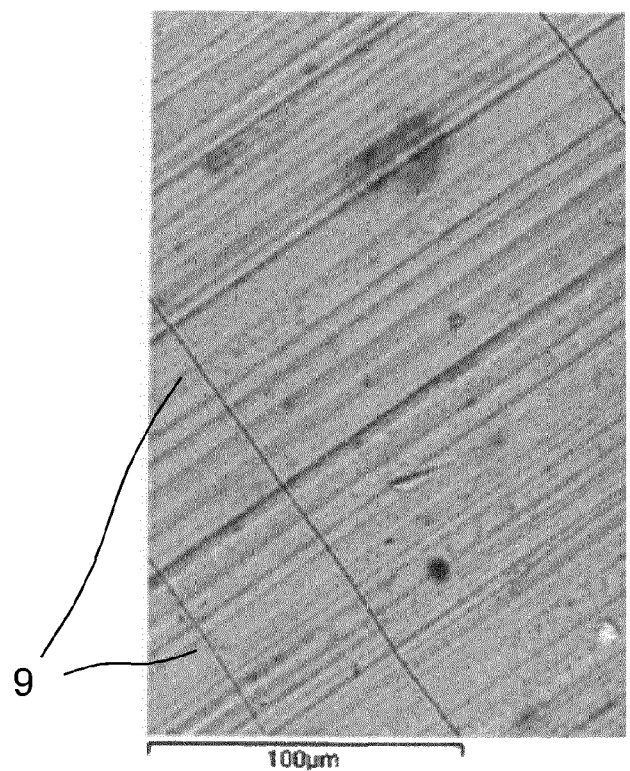
FIG. 2 shows a picture of a state-of-the-art smooth lead tab surface.
Figure 3:
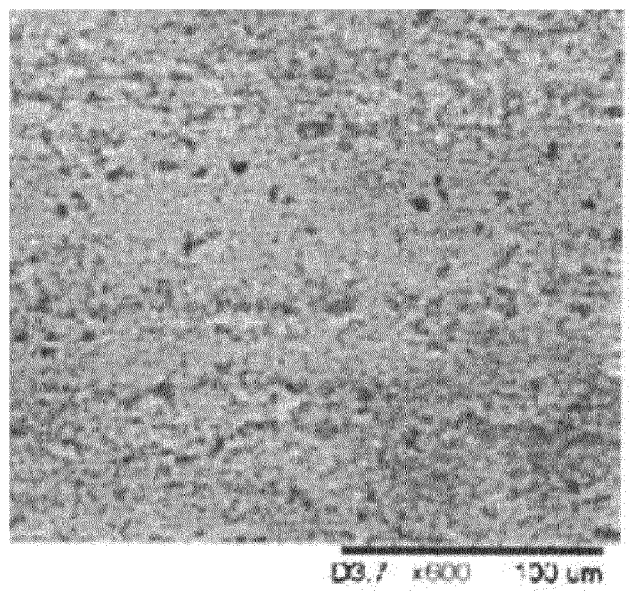
FIG. 3 shows an inventive roughened lead tab surface.

The pictures in FIG. 2 and FIG. 3 were taken by SEM (scanning electron microscopy).

Figure 1:
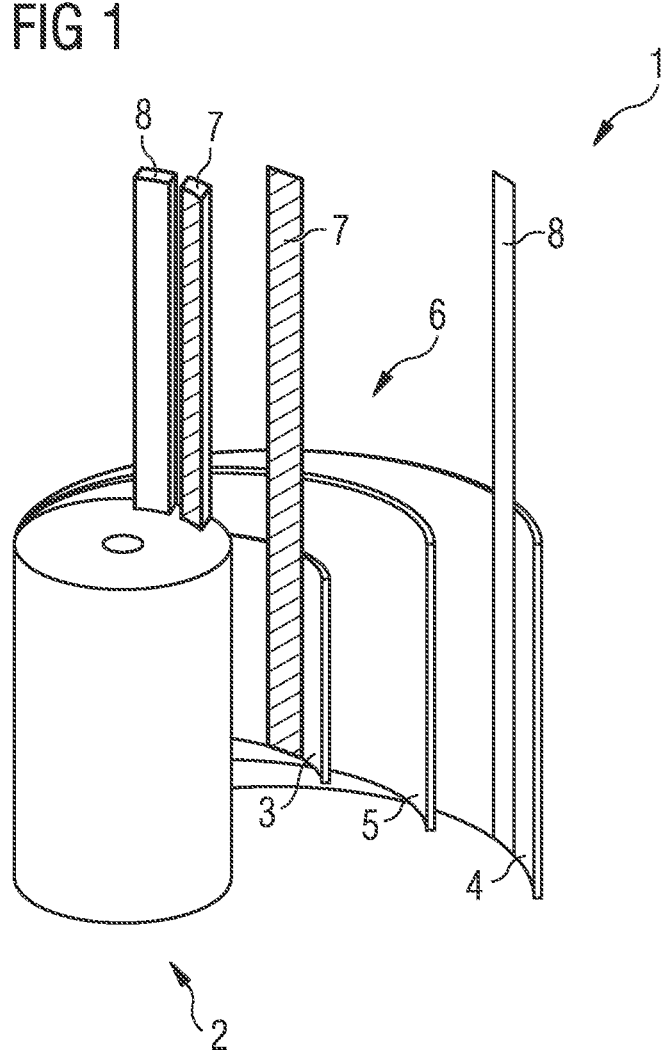
FIG. 1 shows schematically a first embodiment of a winding element of an electrolytic capacitor.

FIG. 1 shows a picture of a first embodiment of a winding element of an electrolytic capacitor 1.

The winding element 2 has for example a diameter of more than 10 mm and a height of more than 12 mm.

The winding element 2 may be housed in a cylindrical can. The can may comprise a bottom and a wall and may be covered by a cap or a cover (not shown in FIG. 1).

The winding element 2 comprises an anode foil 3, a cathode foil 4 and a separator 5 which are wound around a common axis. The separator 5 is arranged between the anode foil 3 and the cathode foil 4. The winding element 2 further comprises another separator which is also arranged between the anode foil 3 and the cathode foil 4 and which is not shown in FIG. 1 to simplify the Figure. In particular, the anode foil 3, the separator 5, the cathode foil 4 and the other separator are stacked in this order and then wound around the axis. The winding element 2 may be impregnated with an electrolyte (standard aluminium electrolytic capacitor) or with a polymer and a working electrolyte (hybrid polymer capacitor).

The capacitor 1 further comprises a liquid electrolyte 6.

The anode foil 3 comprises an aluminium foil. The surface of the aluminium foil may be roughened, e.g. by an etching process.

A dielectric oxide film has been formed on the surface by self-oxidation or an oxidation treatment. Thus, the anode foil 3 comprises aluminium foil having an oxide layer on its surface.

The cathode foil 4 also comprises an aluminium foil where the surface of the aluminium foil may be roughened by an etching process and a dielectric oxide film has been formed on the surface by self-oxidation or an oxidation treatment. Thus, the cathode foil 4 also comprises aluminium foil having an oxide layer on its surface.

Each of the separators 5 is a paper that can be impregnated.

The common axis around which the winding element 2 is wound defines an axial direction.

The winding element 2 further comprises tabs 7, 8 which are used for electrically contacting the winding element 2. The winding element 2 comprises two anode lead tabs 7 which are both connected to the anode foil 3. The anode lead tabs 7 connected to the anode foil 3 extend in a positive axial direction.

Further, the winding element 2 comprises two cathode lead tabs 8 which are connected to the cathode foil 4. The cathode lead tabs 8 connected to the cathode foil 4 extend in the negative axial direction, i.e. in the opposite direction to the anode lead tabs 7 connected to the anode foil 3, or also in the positive axial direction.

The use of multiple anode lead tabs 7 for connecting the anode foil 3 allows to use a long and broad foils 3. The use of multiple tabs 7 further reduces the metal resistance of the winding element 2 as a current can be fed into the winding element 2 at multiple locations, thus reducing the length which the current has to travel inside the winding element 2.

The electrical conductible lead tabs 7, 8 are configured as flexible metal strips fixed to the anode foil 3 or cathode foil 4 on one side and to an external contact on the other side.

The external contact may be a separate element. Preferably, the external contact may be integrated in the cover of the can or in the can's bottom.

The anode lead tabs 7 connect the anode foil 3 with an external contact electrically and mechanically.

The metal strips of the anode lead tabs 7 comprise an electrical conductible metal. In the present example the metal strips comprise aluminum (Al) as a main material.

Specifically, the anode lead tabs 7 comprise high surface aluminum foil.

To provide a high surface aluminum foil the usual smooth surface of an aluminum foil is roughened for example by chemical etching, electrochemical etching, mechanical treatment, plasma treatment, laser treatment or combinations of said processes until a roughened surface is achieved whose area is at least 5 times greater than the specific surface area of a smooth surface.

Preferably, the area is at least 10 times greater than the specific surface area of a smooth surface.

The specific surface area is the ratio from absolute surface area and the surface area of a projected plane.

A specific capacity of 3 $\mu F/cm^2$ or more or preferably 5 $\mu F/cm^2$ or more or more preferably 30 $\mu F/cm^2$ or more is achieved by roughening the surface. The specific capacity of the aluminum foil corresponds directly to its specific surface.

The whole winding element 2 including the anode lead tabs 7 are impregnated by a liquid electrolyte.

On state-of-the-art smooth lead tab surfaces as shown in FIG. 2 electrochemical corrosion caused by halogen anions or by organic halogen compounds comprising halogens leads to disintegration of the anode lead tabs.

The halogen content of the raw materials of the aluminium electrolytic capacitors can never be eliminated completely. Therefore, the electrolyte 6 as well as the surface of the anode lead tabs 7 comprise at least small quantities of halogens, usually about 0.1-0.2 mg/m2 (halogen/surface of the anode lead tab 7) or 0.1-0.2 mg/kg (halogen/electrolyte) and preferably not more than 0.5 mg/m2 (halogen/surface of the anode lead tab 7) or 0.5 mg/kg (halogen/electrolyte).

On the other hand, small quantities of halogens like Cl, Br, I and F ions can initiate corrosion reactions.

The most frequent halogen is Cl, which is a natural impurity of almost every raw material. The halogen ion reaction with the aluminum anode lead tab 7 is self-accelerating and causes early failure of state-of-the-art-capacitors when temperature and applied voltage on capacitors are increasing.

Halogen reactions with metal Al creates soluble Al salts of the halogen ions in a comparably fast reaction R2. Besides, aluminum oxide also reacts with the halogen ions in a comparably slower reaction R1 in the presence of acid electrolyte. Common electrolytes comprise, for example, carboxylic and/or dicarboxylic acids and/or boric acid. Besides, even water, which is every time present in the electrolyte, can act as an acid.

In the presence of water the halogen ions dissociate again in the reaction R3 and start new reactions with aluminium or aluminum oxide (R1, R2). Finally, a chain reaction is started. Also low contents of water in the electrolyte trigger the described reactions. Every common electrolyte comprises at least a small amount of water. The typical ratio of water in the electrolyte is between 0.5% and 16% and in the case of electrolytes used for high voltage capacitors preferably between 3% and 5%.

The letter X in the following formulas symbolizes any halogen (Cl, Br, I, F).

$$Al2O3+6H^++6X^-\rightarrow 2AlX3+3H2O \tag{R1}$$

$$Al+3X^-\rightarrow AlX3+3e^- \tag{R2}$$

$$2AlX3+6H2O\rightarrow 2Al(OH)3+6H^++6X^- \tag{R3}$$

Since in the reaction R2 electrons are accepted by the anode, more negatively charged anions will accumulate at the reaction site.

If the concentration of halogen ions in one point of the surface becomes too high, so called clusters arise where the metallic aluminium can fully react which leads to disintegration of the aluminium foil and thus the anode lead tab.

Especially cracks or voids 9 in the oxide layer, which can never be avoided completely, lead to the creation of such clusters.

An anode lead tab surface with an oxide layer showing the described voids and cracks is shown in FIG. 2.

On the other hand, if the concentration of halogen ions on the surface is low, the acids in the electrolyte react with the aluminum in a comparably slow reaction to form an aluminum oxide layer, which protects the aluminum material of the anode tab 7 from outer chemical impacts.

For example the aluminum may react with oxidizing dicarboxylic acids or boric acid of the liquid electrolyte:

$$2Al + 3O2^- \rightarrow Al2O3 + 6e^-$$

Due to the high surface of the roughened aluminum foil as shown in FIG. 3 the halogen ions are homogenously distributed on the surface and no clusters with locally high current density are reached on the surface. By increasing the specific surface 10 times, the surface concentration of halogens may be decreased to preferably less than 0.05 mg/m2. Thus, the described chain reaction slows down due to locally limited halogen ions.

In this case, even at high temperatures and at high voltages, the electrolyte can oxidize the surface of the anode lead tabs 7 faster than the oxidation layer or the aluminum foil itself is destroyed by the halogen ions because of the very low halogen concentration.

The thickness of the oxide layer is preferably bigger than 3 nm.

Typical working conditions of the described capacitor are high voltages of 550 V or more and temperatures of around 105° C.

The lifetime of the described capacitor before disintegration of the anode lead tab amounts more than 3000 hours. Preferably, the lifetime amounts more than 5000 hours.

The invention claimed is:

1. An anode lead tab configured for externally contacting an anode foil in an electrolytic capacitor, the anode lead tab having a roughened surface configured to protect the anode lead tab from surface dissolution, wherein a specific surface area of the roughened surface is at least 10 times greater than a specific surface area of a smooth surface.

2. The anode lead tab of claim 1, wherein a specific capacity of the roughened surface is 3 µF/cm² or more.

3. The anode lead tab of claim 1, wherein the anode lead tab comprises aluminum as a main material.

4. The anode lead tab of claim 1, wherein the roughened surface is passivated by an oxide layer.

5. The anode lead tab of claim 4, wherein the oxide layer has at least a thickness of 3 nm.

6. An aluminum electrolytic capacitor comprising:
the anode lead tab according to claim 1.

7. An aluminum electrolytic capacitor comprising:
at least two anode lead tabs according to claim 1.

8. A method for manufacturing an anode lead tab having a roughened surface, the method comprising:
providing the anode lead tab with a smooth surface; and
roughening the smooth surface by chemical etching, electrochemical etching, mechanical treatment, plasma treatment, laser treatment or combinations thereof until a specific capacity of 3 µF/cm² or more is achieved,
wherein a specific surface area of the roughened surface is at least 10 times greater than a specific surface area of the smooth surface.

9. An electrolytic capacitor comprising:
an anode foil; and
an anode lead tab connected to the anode foil,
wherein the anode lead tab is configured for externally contacting, and
wherein the anode lead tab has a roughened surface configured to protect the anode lead tab from surface dissolution, and
wherein a specific surface area of the roughened surface is at least 10 times greater than a specific surface area of a smooth surface.

10. The electrolytic capacitor of claim 9, wherein a specific capacity of the roughened surface is 3 µF/cm² or more.

* * * * *